(12) United States Patent
Graham et al.

(10) Patent No.: US 10,832,481 B2
(45) Date of Patent: Nov. 10, 2020

(54) MULTI-SCREEN INTERACTIONS IN VIRTUAL AND AUGMENTED REALITY

(71) Applicant: Disney Enterprises, Inc., Burbank, CA (US)

(72) Inventors: Todd Michael Graham, Lewis Center, OH (US); John H. Crocker, Valencia, CA (US); Elliott H. Baumbach, Porter Ranch, CA (US); Amy E. Nelson, Los Angeles, CA (US)

(73) Assignee: Disney Enterprises, Inc., Burbank, CA (US)

(\*) Notice: Subject to any disclaimer, the term of this patent is extended or adjusted under 35 U.S.C. 154(b) by 25 days.

(21) Appl. No.: 16/108,013

(22) Filed: Aug. 21, 2018

(65) Prior Publication Data

US 2020/0066043 A1    Feb. 27, 2020

(51) Int. Cl.
| | | |
|---|---|---|
| *G06T 19/00* | (2011.01) | |
| *G02B 27/01* | (2006.01) | |
| *G06F 3/01* | (2006.01) | |
| *A63F 13/5252* | (2014.01) | |
| *G06T 7/73* | (2017.01) | |

(52) U.S. Cl.
CPC ........ *G06T 19/006* (2013.01); *A63F 13/5252* (2014.09); *G02B 27/0172* (2013.01); *G06F 3/011* (2013.01); *G06T 7/73* (2017.01)

(58) Field of Classification Search
CPC ..... G06T 19/006; G06T 7/73; A63F 13/5252; G02B 27/0172; G06F 3/011
See application file for complete search history.

(56) References Cited

U.S. PATENT DOCUMENTS

| 6,128,019 A * | 10/2000 | Crocker, III ............ G06T 17/05 |
| | | 345/419 |
| 9,691,181 B2 * | 6/2017 | Watson .............. G02B 27/2228 |
| 9,818,225 B2 * | 11/2017 | Mao ........................ A63F 13/42 |
| 9,865,093 B1 | 1/2018 | Mullins |
| 9,916,002 B2 | 3/2018 | Petrovskaya et al. |
| 9,952,820 B2 | 4/2018 | Anderson et al. |
| 2013/0194278 A1 * | 8/2013 | Zajac, III ................ A63F 13/10 |
| | | 345/473 |

(Continued)

OTHER PUBLICATIONS

Zhou et al., "Trends in Augmented Reality Tracking,Interaction and Display," Oct. 3, 2018, IEEE Xplore, 10 pages.

*Primary Examiner* — Yu Chen
(74) *Attorney, Agent, or Firm* — Patterson + Sheridan, LLP

(57) ABSTRACT

Techniques for providing multi-screen interaction in an interactive application. A primary device establishes an application session. The application session includes a virtual environment relating to a physical environment in which the primary user device is located. The primary user device is configured to display a graphical image relating to a primary virtual camera view of the virtual environment. A secondary virtual camera view of the virtual environment, relating to the primary virtual camera view, is determined. The primary user device transmits image data relating to the secondary virtual camera view from the primary user device to a secondary user device, which is configured to display a graphical image based on the image data. Responsive to receiving an interaction request from the secondary user device, the primary user device controls the application session based on the interaction request.

19 Claims, 9 Drawing Sheets

(56) References Cited

U.S. PATENT DOCUMENTS

| | | | |
|---|---|---|---|
| 2013/0290876 A1* | 10/2013 | Anderson | G06T 19/006 |
| | | | 715/761 |
| 2015/0029218 A1* | 1/2015 | Williams | G06T 19/006 |
| | | | 345/633 |
| 2016/0300392 A1 | 10/2016 | Jonczyk et al. | |
| 2017/0053447 A1* | 2/2017 | Chen | G06T 19/006 |
| 2017/0090589 A1 | 3/2017 | Sharma et al. | |
| 2017/0193704 A1* | 7/2017 | Leppanen | G06F 3/1454 |
| 2017/0236330 A1 | 8/2017 | Seif | |
| 2018/0004478 A1 | 1/2018 | Chen | |
| 2018/0088890 A1 | 3/2018 | Pohl | |
| 2018/0096519 A1* | 4/2018 | Tokubo | A63F 13/211 |

* cited by examiner

MULTI-SCREEN INTERACTIONS IN VIRTUAL AND AUGMENTED REALITY

BACKGROUND

Field of the Invention

This disclosure relates in general to virtual reality (VR) and augmented reality (AR), and more particularly, though not exclusively, to multi-screen interaction with an interactive AR or VR application.

Description of the Related Art

Many AR and VR applications use a head mounted display to provide to a user a virtual environment corresponding to the physical environment in which the user is located. But consumers of AR and VR applications sometimes buy only one head mounted display, allowing only one consumer at a time to use the application. For example, an AR or VR video game might require a head mounted display. A consumer that purchases only one head mounted display would then be limited to a single player game experience. This can isolate the player from people around them, and can limit the game play options.

SUMMARY

Embodiments described herein include a method of providing multi-screen interaction in an interactive application. The method includes establishing an application session using a primary user device. The application session includes a virtual environment relating to a physical environment in which the primary user device is located. The primary user device is configured to display a graphical image relating to a primary virtual camera view of the virtual environment. The method further includes determining a secondary virtual camera view of the virtual environment. The secondary virtual camera view relates to the primary virtual camera view. The method further includes transmitting image data relating to the secondary virtual camera view from the primary user device to a secondary user device. The secondary user device is configured to display a graphical image relating to the secondary virtual camera view based on the image data. The method further includes, responsive to receiving an interaction request from the secondary user device, controlling, by the primary user device, the application session based on the interaction request.

Embodiments described herein further include a computer program product for providing multi-screen interaction in an interactive application. The computer program product includes a computer-readable storage medium having computer-readable program code embodied therewith, the computer-readable program code executable by one or more computer processors to perform an operation. The operation includes establishing an application session using a primary user device. The application session includes a virtual environment relating to a physical environment in which the primary user device is located. The primary user device is configured to display a graphical image relating to a primary virtual camera view of the virtual environment. The operation further includes determining a secondary virtual camera view of the virtual environment. The secondary virtual camera view relates to the primary virtual camera view. The operation further includes transmitting image data relating to the secondary virtual camera view from the primary user device to a secondary user device. The secondary user device is configured to display a graphical image relating to the secondary virtual camera view based on the image data. The operation further includes, responsive to receiving an interaction request from the secondary user device, controlling, by the primary user device, the application session based on the interaction request.

Embodiments described herein further include a system. The system includes a processor and a memory, the memory storing a program, which, when executed on the processor, performs an operation. The operation includes establishing an application session using a primary user device. The application session includes a virtual environment relating to a physical environment in which the primary user device is located. The primary user device is configured to display a graphical image relating to a primary virtual camera view of the virtual environment. The operation further includes determining a secondary virtual camera view of the virtual environment. The secondary virtual camera view relates to the primary virtual camera view. The operation further includes transmitting image data relating to the secondary virtual camera view from the primary user device to a secondary user device. The secondary user device is configured to display a graphical image relating to the secondary virtual camera view based on the image data. The operation further includes, responsive to receiving an interaction request from the secondary user device, controlling, by the primary user device, the application session based on the interaction request.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
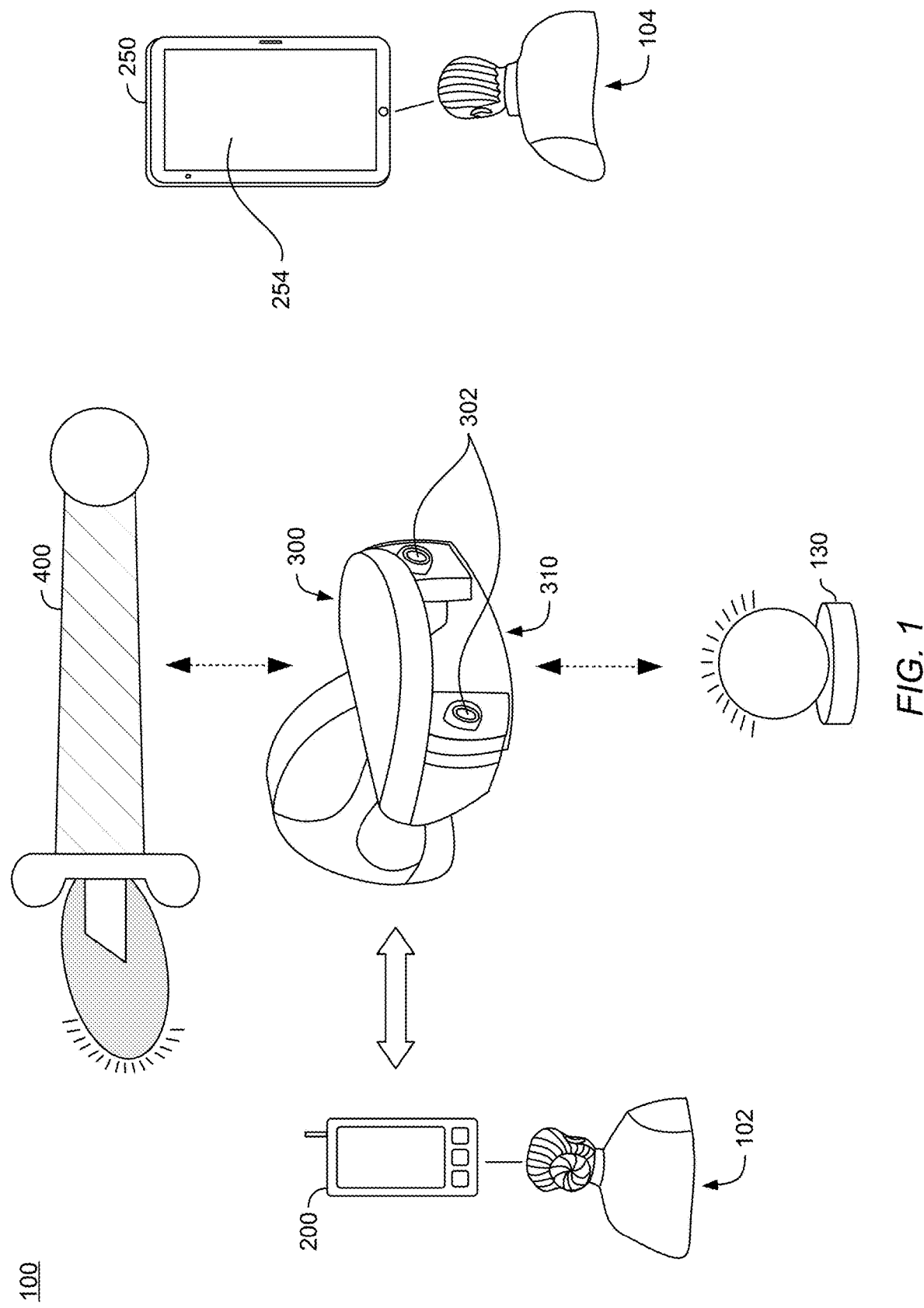
FIG. 1 is an illustration of an exemplary interactive environment, according to one embodiment described herein.

A second screen can facilitate multi-user interaction with an AR/VR application. For example, a primary user of an AR/VR video game could generate a virtual environment relating to the primary user's physical environment. The primary user can use a head mounted display to view and interact with the virtual environment. A secondary user could view and interact with the virtual environment in the video game using a device with a traditional two dimensional display, like a smartphone, tablet, television, or computer. In an embodiment, the secondary user can both view the virtual environment in the game simultaneously with the primary user, and interact with the game simultaneously with the primary user.

Multi-user interaction with an AR/VR application, however, can give rise to a number of technical problems. For example, a primary user and a secondary user may be located in different physical locations (e.g., different locations in a room). An AR/VR application may include virtual objects or characters, tied to specific physical locations. The differing physical locations of the primary and secondary users can provide differing perspective views of these virtual objects or characters, which may need to be taken into account to accurately display the virtual objects or characters to each player. For example, a virtual object may appear in one portion of the primary user's display, from a forward-facing perspective, based on the primary user's physical location, and may appear in a different portion of the secondary user's display, from a side-profile perspective, based on the secondary user's location. One or more techniques disclosed herein facilitate harmonizing the primary and secondary displays to accurately depict the differing physical perspectives of the primary and secondary users.

As another example, there may be technical challenges associated with establishing a frame of reference between user devices that have different components for tracking the physical world. For example, a primary user might use a head mounted display (e.g., the head mounted display 300 discussed below) with two cameras, while a secondary user might use a smartphone or tablet with a single camera. One or more techniques disclosed herein facilitate establishing a frame of reference between these differing devices, accounting for the differing components.

In an embodiment, the primary user's AR/VR gameplay device (e.g., the primary user's head mounted display or smartphone) acts as a network server. One or more secondary users can then connect to the primary user's gameplay device with their own gameplay devices. The secondary users devices act as network clients. In an embodiment, gameplay can be controlled locally by the primary and secondary users' devices. Alternatively, gameplay could be partially (or completely) controlled by a central server, including a cloud server.

In an embodiment, the secondary user can view a tailored version of the virtual environment. In an embodiment, primary and secondary users can be located in the same physical environment, and the virtual environment can correspond to the shared physical environment. In an embodiment, the secondary user could be provided with a view of the virtual environment that is similar (or identical) to the view provided to the primary user.

Alternatively, the secondary user could be provided with his or her own view of the virtual environment, different from the primary user. In an embodiment, this secondary view could correspond with the secondary user's location in the shared physical environment with the primary user. In an embodiment, the AR/VR application can reconcile the physical locations of the primary and secondary users in the shared physical environment, and can provide the secondary user with a view of the AR/VR application tied to the secondary user's physical location relative to the primary user. Alternatively, the AR/VR application can provide the secondary user with control of his or her view.

Further, in an embodiment, the secondary user can not only view the application but can also interact with the application. For example, if the primary user is playing an AR/VR video game, the secondary user could be provided with supplemental actions to assist in gameplay. In this example, a secondary user could provide input via a secondary user device (e.g., by tapping or swiping a touch sensitive screen), which would affect the state of the AR/VR application (e.g., providing an attack or other interaction in the video game, to assist the primary user). Further, the secondary user could provide textual, graphical, or audio comments to the primary user about the gameplay.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., an AR/VR application 240 or a central server 950 application) or related data available in the cloud. For example, the AR/VR application 240 could execute on a computing system in the cloud and control the use of the application. In such a case, the AR/VR application 240 could control user of the application and store data related to the application at a storage location in the cloud. Doing so allows a user to access this information from any computing system attached to a network connected to the cloud (e.g., the Internet).

FIG. 1 is an illustration of an exemplary interactive environment, according to one embodiment described herein. In the example embodiment illustrated in FIG. 1, the interactive environment is an AR/VR video game, but embodiments herein can be used with any suitable AR/VR application. Within a system 100, a head mounted display 300 is worn by a primary user 102 and communicates with a primary user device 200. This communication can be done wirelessly, through Bluetooth® communications or any other suitable method. Further, the head mounted display 300 can be connected to the primary user device 200 directly, or through a wired connection. For example, the head mounted display 300 can be connected to the primary user device 200 through a USB interface. In an embodiment, data can be transmitted between the head mounted display 300 and the primary user device 200 on a periodic basis (e.g. 60 Hz).

The head mounted display 300 can be a headset to be worn by the primary user 102, or may be any device including a visual display of any suitable type. For example, the head mounted display 300 may include any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The head mounted display may include a partially, or fully, transparent window through which a user may view the physical world. The head mounted display 300 is discussed further with regard to FIG. 3, below.

In some embodiments, the head mounted display 300 is separate from the primary user device 200 but is configured to superimpose virtual imagery onto physical objects in the user's field of view. For example, as illustrated in FIG. 1 the head mounted display 300 may be a body-worn device. The head mounted display 300 further includes a holder 310 for a primary user device 200. For example, the primary user device 200 can be a portable device like a smartphone or tablet. The primary user device 200 can be inserted into the holder 310 in the head mounted display 300 during gameplay. The primary user device 200 is described in more detail with respect to FIG. 2.

The head mounted display 300 may also be configured as an eyepiece or lens worn in front of the user's eye. In another example, the head mounted display 300 may be integrated into other devices that are carried or handled by the user, or having any other suitable user interaction during the game playing experience. For example, while participating in game play, the user may carry a toy blaster that includes an optical sight for aiming, and the head mounted display 300 may be integrated in the optical sight.

In some embodiments, the primary user device 200 operates in an AR mode, generally configured to superimpose virtual images such as characters, objects, and/or dynamic visual effects into the user's natural field of view of the environment using a head mounted display 300. The field of view of the user is generally determined using sensor devices such as the visual sensors 302. In some embodiments, the primary user device 200 is configured to operate in a VR mode, generally replacing the user's natural field of view of the environment with virtual imagery using the head mounted display 300.

For example, the head mounted display 300 may superimpose a virtual character to appear seated on a physical chair detected within the environment. The display of the virtual character on the head mounted display 300 is dynamically adjusted based on the user's field of view (orientation), the determined depth of the chair from the user, and so forth. As another example, the head mounted display 300 could superimpose a virtual blade extending from the peripheral device 400 (e.g., a sword hilt) held in the user's hand. In one embodiment, the virtual image can be generated by the primary user device 200 and displayed as a reflected image on the head mounted display 300. The head mounted display 300 can include optical elements like mirrors, beam splitters, and the like to facilitate display of the reflected image. The head mounted display 300 can also include lenses or other optical elements.

In some embodiments, the primary user device 200 is configured to dynamically select one of the AR mode and VR mode based on the sensed characteristics of the environment and/or based on the game play. For example, the visual sensors 302 may detect that the environment is extremely bright (e.g., when the user is in direct sunlight), which may be difficult for a user to view overlaid information using the head mounted display 300. In another example, the gameplay may specify a night-time setting. In these examples, the VR mode may be enabled in order to substantially isolate the user's field of view from the surrounding physical environment and thereby reduce the amount of light received from the environment. In both cases, dynamic selection of the AR/VR display mode can improve the immersive nature of the gameplay environment, whether through ensuring the user is able to suitably view the overlaid information or through providing a more realistic setting consistent with the virtual setting of the game.

The head mounted display 300 provides a compact AR/VR display that may be carried or worn by the user during the gameplay experience. As discussed above, the head mounted display 300 may include devices that are separate from the display of the primary user device 200. Implementations of the compact AR/VR display that use a smartphone or other mobile computing device offer several advantages. For example, implementations able to adapt the user's smartphone provide a reduced manufacturing cost of the compact AR/VR display, as no separate computing hardware need be included. A camera included in the smartphone may be used as visual sensor 302 to dynamically provide information regarding the physical environment and the user's field of view. Using a smartphone may also provide increased convenience to the user, and may provide a relatively large display for viewing.

A number of considerations influence the design of a compact AR/VR display that uses a mobile computing device. Generally, the compact AR/VR display includes an optical arrangement that is configured to transmit some or all of the display of the mobile computing device to the user's eyes. Depending on the currently selected mode (AR or VR), the optical arrangement is further configured to transmit some or all of the light from the physical environment to the user's eyes. It may be beneficial to design a compact AR/VR display to have a relatively small size and weight. Smaller and lighter body-worn implementations allow for use by younger users or other users with reduced size and/or strength, and are generally less fatiguing during use. The positioning of the mobile computing device and/or the optical arrangement can also be selected to reduce a moment on the user. For example, in a head-worn compact AR/VR display, including a smartphone in a position closer to the user's head provides a smaller moment (e.g., corresponding to strain on the neck or upper body) than an implementation in which the smartphone is positioned further from the user's head. A compact (small-sized) implementation also reduces manufacturing costs through reduced material and process requirements. A compact implementation may also be more aesthetically pleasing for users, when compared with a large or bulky implementation.

The system 100 further includes a tracking beacon 130. The tracking beacon 130 includes a light that can be used as a reference point by the primary user device 200 and/or the head mounted display 300. The visual sensors 302 in the head mounted display 300 can be used to track the light from the tracking beacon 130 in order to provide a reference point for the floor in the user's physical location. Further, the tracking beacon 130 can be in communication with the primary user device 200 and/or the head mounted display 300 through a suitable wireless or wired communication protocol.

The system 100 further includes the peripheral device 400. In the AR/VR video game illustrated in FIG. 1, the peripheral device 400 acts as a game controller, simulating a sword or staff to the user. The peripheral device 400 can be in communication with a primary user device 200, a head mounted display 300, and/or a tracking beacon 130. This communication can be done wirelessly through Bluetooth communications, via a wired connection, or through any other suitable method.

The system 100 further includes a secondary user device 250, operated by a second user 104. In an embodiment, the system 100 includes a primary user 102 and one secondary user 104. Alternatively, the system can include multiple secondary users 104 and multiple secondary user devices 250. In an embodiment, the secondary user device 250 is a smartphone, tablet, computer, or other device that provides a display 254. In an embodiment, the display 254 provides to the second user 104 a secondary view of the AR/VR application displayed to the primary user 102. In an embodiment, the secondary user device 250 includes an input component, for example a touch screen, keyboard, or mouse. Alternatively, the display 254 can be a television, and the user device 250 can include a separate input device, for example a remote control, smartphone app, or video game controller. The secondary device 250 is discussed in more detail in relation to FIG. 2.

Figure 2:
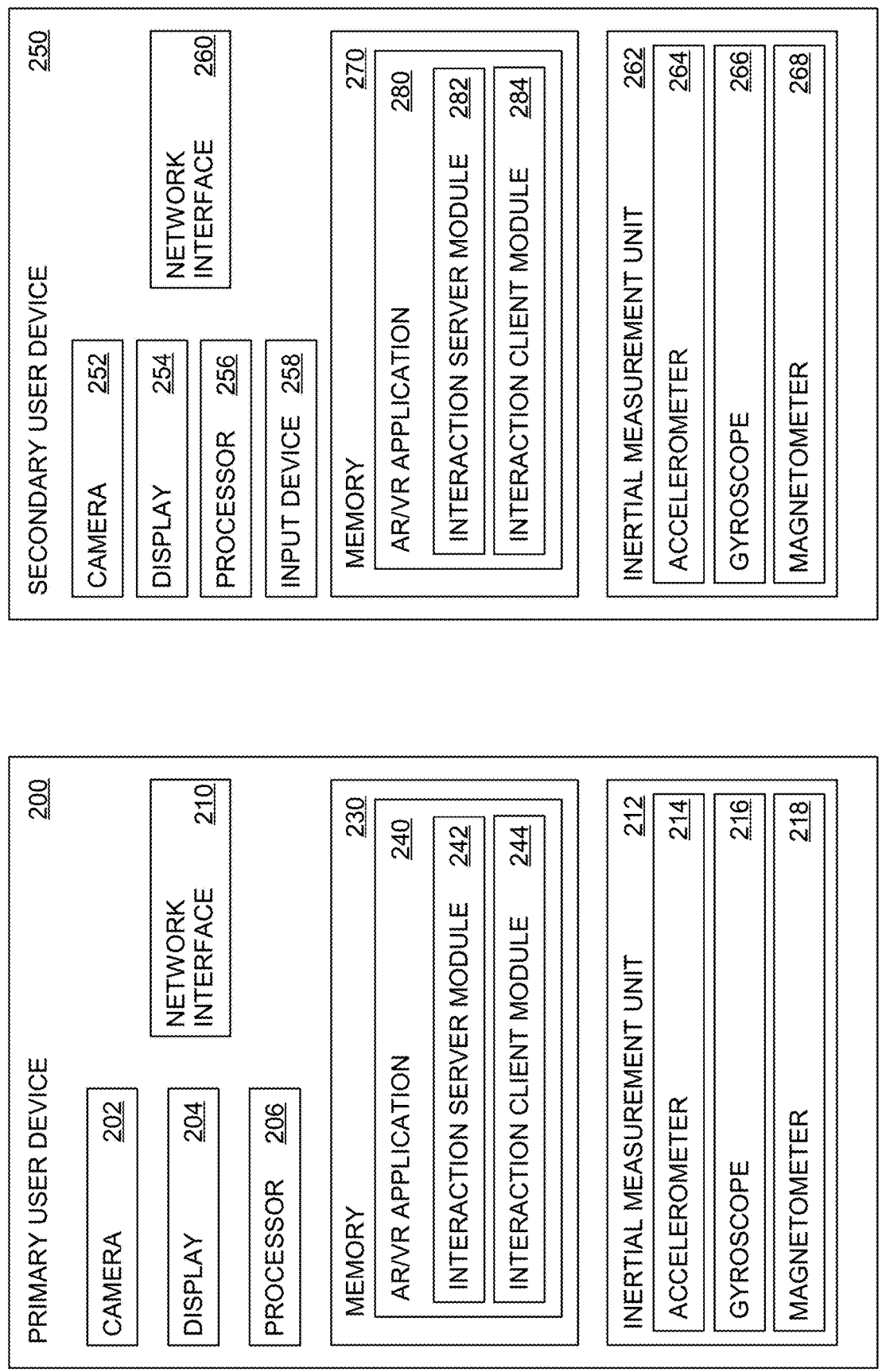
FIG. 2 is a block diagram illustrating primary and secondary user devices, according to one embodiment described herein.

FIG. 2 is a block diagram illustrating primary and secondary user devices, according to one embodiment described herein. The primary user device 200 can be a smartphone, tablet, or any other suitable device. The primary user device 200 can be separate from the head mounted display 300, or the primary user device 200 and the head mounted display 300 can be integrated together to form a combined device. The primary user device 200 includes a camera 202. The camera 202 can be configured to sense visible light and/or infrared light. Alternatively, the camera 202 can be any other form of suitable visual sensor. The primary user device 200 further includes a display 204. The display 204 may include any type of dynamic display capable of displaying a visual interface to a user, and may include any type of LED, OLED, CRT, LCD, plasma, electroluminescence, or other display technology.

The primary user device 200 further includes a network interface 210. In an embodiment, the network interface 210 includes hardware and software sufficient to establish a connection over a communication network. In an embodiment, the network interface 210 can use any suitable communication network, including the Internet, a local access network, or a wide access network. The network interface 210 can be a wired or wireless network. The network interface 210 can use any suitable communication protocol, including any suitable wireless protocol. For example, the network interface 210 can use an IEEE Wi-Fi standard, like an 802.11 standard, another Wi-Fi standard, a cellular protocol (including 3G, LTE, 4G and others), Bluetooth, and others. Further, the network interface 210 can use several different communication protocols.

The primary user device 200 further includes a processor 206 which generally retrieves and executes programming instructions stored in the memory 230. The processor 206 is included to be representative of a single central processing unit (CPU), multiple CPUs, a single CPU having multiple processing cores, graphics processing units (GPUs) having multiple execution paths, and the like. The memory 230 is generally included to be representative of electronic storage of any suitable type(s), including random access memory or non-volatile storage.

The memory 230 generally includes program code for performing various functions related to game play. The program code is generally described as various functional "applications" or "modules" within the memory 230, although alternate implementations may have different functions and/or combinations of functions. Within the memory 230, the AR/VR application 240 is generally configured to control the AR/VR application for the user. The AR/VR application 240 can, for example, be an AR/VR video game, or any other suitable AR/VR application.

The AR/VR application 240 includes the interaction server module 242 and the interaction client module 244. In an embodiment, the interaction server module 242 is generally configured to act as a network server to facilitate second screen interaction with the AR/VR application 240. In an embodiment, the interaction server module 242 is generally configured to act as a network client to facilitate second screen interaction with the AR/VR application 240. Each of these is discussed in more detail with relation to FIGS. 5-9. In an embodiment, the AR/VR application 240 includes both the interaction server module 242 and the interaction client module 244. Alternatively, the AR/VR application in the memory 230 of the primary user device 200 includes only the interaction server module 242.

The primary user device 200 includes an Inertial Measurement Unit (IMU) 212. The IMU 212 includes sensors to measure the position and orientation of the primary user device 200. For example, the IMU 212 can include an accelerometer 214 which measures acceleration forces stemming from movement of the primary user device 200 in the user's physical environment. The IMU 212 can further include a gyroscope 216 that measures orientation of the primary user device 200 in the user's physical environment. The IMU 212 can further include the magnetometer 218 which measures properties of a magnetic field in the primary user's physical environment. The accelerometer 214, gyroscope 216, and magnetometer 218 are merely examples of sensors that can be included within the IMU 212. In an embodiment, the IMU 212 can include additional suitable sensors, or can include fewer sensors.

The secondary user device 250 can be a smartphone, tablet, computer, or any other suitable device. Further, the secondary user device can be made up of multiple components (e.g., a television and smartphone or game controller). The secondary user device 250 includes a camera 252. The camera 252 can be configured to sense visible light and/or infrared light. Alternatively, the camera 252 can be any other form of suitable visual sensor. The secondary user device 250 further includes a display 254. The display 254 may include any type of dynamic display capable of displaying a visual interface to a user, and may include any type of LED, OLED, CRT, LCD, plasma, electroluminescence, or other display technology.

The secondary user device further includes an input device 258. In an embodiment, the input device 258 is integrated into the secondary user device. For example, the input device 258 can be a touch screen or keyboard integrated into a smart phone, table, or computer. Alternatively, the input device 258 is a separate component in a multi-component device. For example, the display 254 can be a television or other separate screen and the input device 258 can be a separate smart phone, remote control, or game controller.

The secondary user device 250 further includes a network interface 260. In an embodiment, the network interface 260 includes hardware and software sufficient to establish a connection over a communication network. In an embodiment, the network interface 260 can use any suitable communication network, including the Internet, a local access network, or a wide access network. The network interface 260 can be a wired or wireless network. The network interface 260 can use any suitable communication protocol, including any suitable wireless protocol. For example, the network interface 260 can use an IEEE Wi-Fi standard, like an 802.11 standard, another Wi-Fi standard, a cellular protocol (including 3G, LTE, 4G and others), Bluetooth, and others. Further, the network interface 260 can use several different communication protocols.

The secondary user device 250 further includes a processor 256 which generally retrieves and executes programming instructions stored in the memory 270. The processor 256 is included to be representative of a single central processing unit (CPU), multiple CPUs, a single CPU having multiple processing cores, graphics processing units (GPUs) having multiple execution paths, and the like. The memory 270 is generally included to be representative of electronic storage of any suitable type(s), including random access memory or non-volatile storage.

The memory 270 generally includes program code for performing various functions related to game play. The program code is generally described as various functional "applications" or "modules" within the memory 270, although alternate implementations may have different functions and/or combinations of functions. Within the memory 270, the AR/VR application 280 is generally configured to control the AR/VR application for the user. The AR/VR application 280 can, for example, be an AR/VR video game, or any other suitable AR/VR application. In an embodiment, the AR/VR application 280 in the secondary user device is the same as the AR/VR application 240 in the primary user device. Alternatively, the AR/VR application 280 is different from the AR/VR application 240.

The AR/VR application 280 includes the interaction server module 282 and the interaction client module 284. In an embodiment, the interaction server module 282 is generally configured to act as a network server to facilitate second screen interaction with the AR/VR application 280. In an embodiment, the interaction server module 282 is generally configured to act as a network client to facilitate second screen interaction with the AR/VR application 280. Each of these is discussed in more detail with relation to FIGS. 5-9. In an embodiment, the AR/VR application 280 includes both the interaction server module 282 and the interaction client module 284. Alternatively, the AR/VR application in the memory 270 of the secondary user device 250 includes only the interaction client module 284.

The secondary user device 250 includes an IMU 262. The IMU 262 includes sensors to measure the position and orientation of the primary user device 200. For example, the IMU 262 can include an accelerometer 264 which measures acceleration forces stemming from movement of the secondary user device 250 in the user's physical environment. The IMU 262 can further include a gyroscope 266 that measures orientation of the secondary user device 250 in the user's physical environment. The IMU 262 can further include the magnetometer 268 which measures properties of a magnetic field in the primary user's physical environment. The accelerometer 264, gyroscope 266, and magnetometer 268 are merely examples of sensors that can be included within the IMU 262. In an embodiment, the IMU 262 can include additional suitable sensors, or can include fewer sensors.

Figure 3:
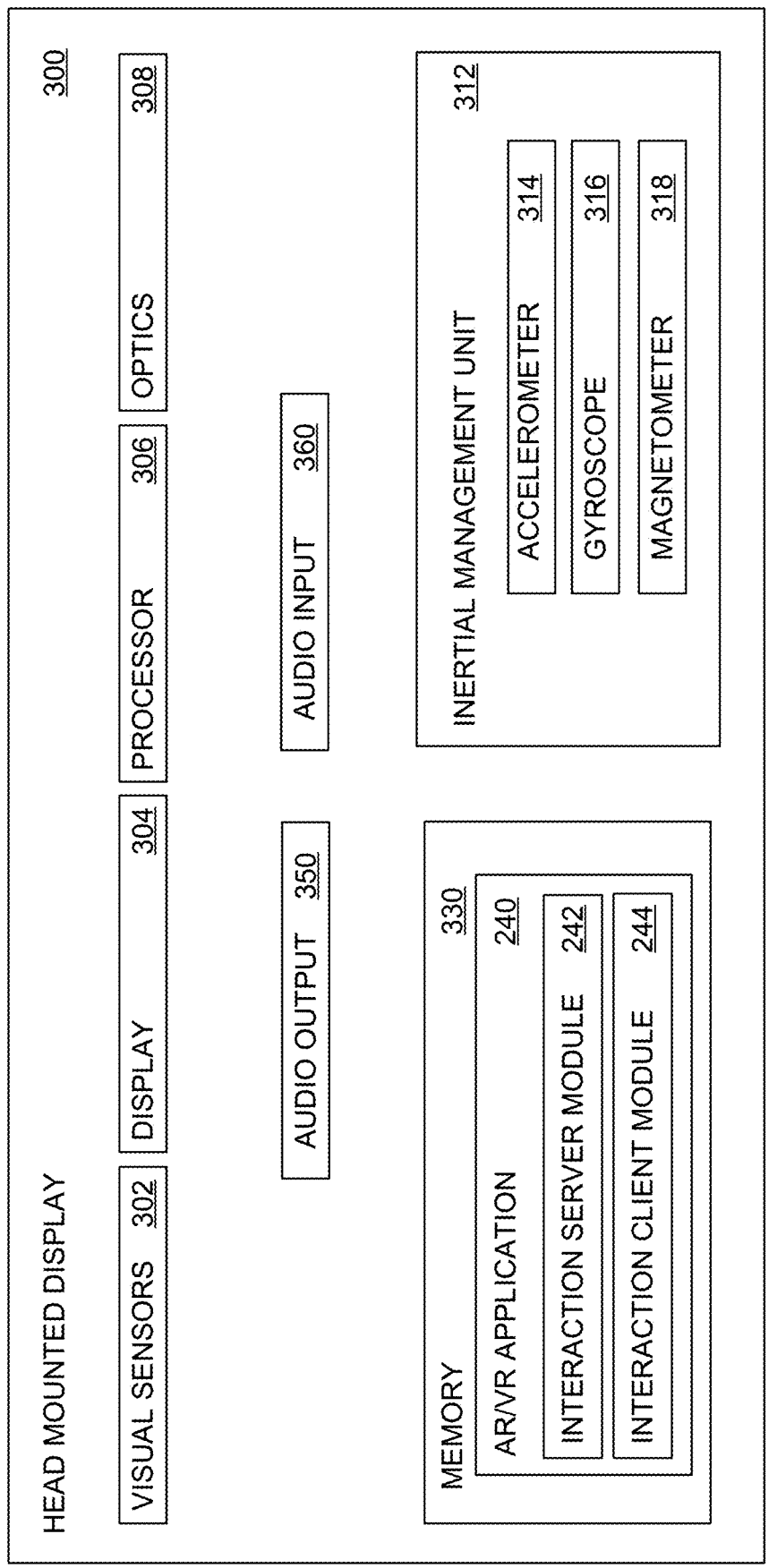
FIG. 3 is a block diagram illustrating a head mounted display, according to one embodiment described herein.

FIG. 3 illustrates an exemplary head mounted display 300, according to one embodiment. The head mounted display 300 can be separate from the user device 200, or the user device 200 and the head mounted display 300 can be integrated together to form a combined device. The head mounted display 300 includes one or more visual sensors 302. The visual sensors 302 can be configured to sense visible light and/or infrared light. Alternatively, the visual sensors 302 can be any other form of suitable visual sensor. The head mounted display 300 further includes a display 304. The display 304 may include any type of dynamic display capable of displaying a visual interface to a user, and may include any type of LED, OLED, CRT, LCD, plasma, electroluminescence, or other display technology.

The head mounted display 300 includes optics 308. The optics 308 can include mirrors, lenses, beam-splitters, and other suitable components. The optics 308 can be used to facilitate display of the virtual and physical environment to the user. The head mounted display 300 includes audio output 350. The audio output 350 can be speakers, headphones, or any other suitable device to output audio. The head mounted display 300 further includes audio input 360. The audio input 360 can be a microphone, or any other suitable audio input device. In an embodiment, the audio output 350 and audio input 360 are components of the user device 200 (e.g., a microphone and speakers in a mobile telephone or table). In another embodiment, the audio output 350 and audio input 360 are separate components in the head mounted display 300.

In an embodiment, the head mounted display 300 can be a lightweight display that does not include its own processor and memory, but instead relies on the primary user device 200 for operation. For example, the head mounted display 300 can be a slip-in display, in which the processor 206 and the memory 230 of the primary user device 200 control display and operation of the AR/VR application.

Alternatively, the head mounted display 300 can include its own processor 306 which generally retrieves and executes programming instructions stored in the memory 330. The processor 306 is included to be representative of a single central processing unit (CPU), multiple CPUs, a single CPU having multiple processing cores, graphics processing units (GPUs) having multiple execution paths, and the like. The memory 330 is generally included to be representative of electronic storage of any suitable type(s), including random access memory or non-volatile storage.

The memory 330 generally includes program code for performing various functions related to game play. The program code is generally described as various functional "applications" or "modules" within the memory 330, although alternate implementations may have different functions and/or combinations of functions. Within the memory 330, the AR/VR application 340 is generally configured to control the AR/VR application for the user. The AR/VR application 340 can, for example, be an AR/VR video game, or any other suitable AR/VR application. The AR/VR application 240 in the head mounted display 300 can be generally the same as the AR/VR application 240 in the primary user device 200. Or the AR/VR application 240 in the head mounted display 300 can be different from the AR/VR application 240 in the primary user device 200.

The AR/VR application 240 includes the interaction server module 242 and the interaction client module 244. In an embodiment, the interaction server module 242 is generally configured to act as a network server to facilitate second screen interaction with the AR/VR application 240. In an embodiment, the interaction server module 242 is generally configured to act as a network client to facilitate second screen interaction with the AR/VR application 240. Each of these is discussed in more detail with relation to FIGS. 5-9. In an embodiment, the AR/VR application 240 includes both the interaction server module 242 and the interaction client module 244. Alternatively, the AR/VR application in the memory 330 of the head mounted display 300 includes only the interaction server module 242.

The head mounted display 300 includes an IMU 312. As illustrated in FIG. 3, the IMU 312 is separate from the IMU 212 included in the primary user device 200. Alternatively, the head mounted display 300 can rely on the IMU 212 in the primary user device 200. The IMU 312 includes sensors to measure the position and orientation of the head mounted display 300. For example, the IMU 312 can include an accelerometer 314 which measures acceleration forces stemming from movement of the head mounted display 300 in the user's physical environment. The IMU 312 can further include a gyroscope 316 that measures orientation of the head mounted display 300 in the user's physical environment. The IMU 312 can further include the magnetometer 318 which measures properties of a magnetic field in the user's physical environment. The accelerometer 314, gyroscope 316, and magnetometer 318 are merely examples of sensors that can be included within the IMU 312. In an embodiment, the IMU can include additional suitable sensors, or can include fewer sensors. For example, the IMU 312 can include only a magnetometer 318, without an accelerometer or gyroscope.

Figure 4B:
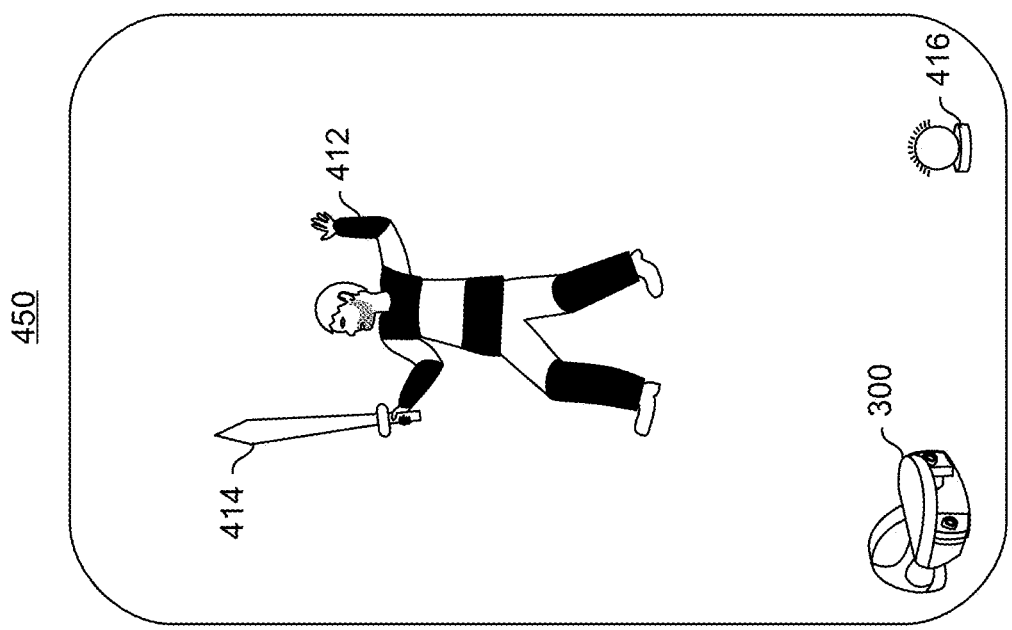
FIGS. 4A and 4B are illustrations of views provided in an AR/VR application to primary and secondary users, according to one embodiment described herein.
Figure 4A:
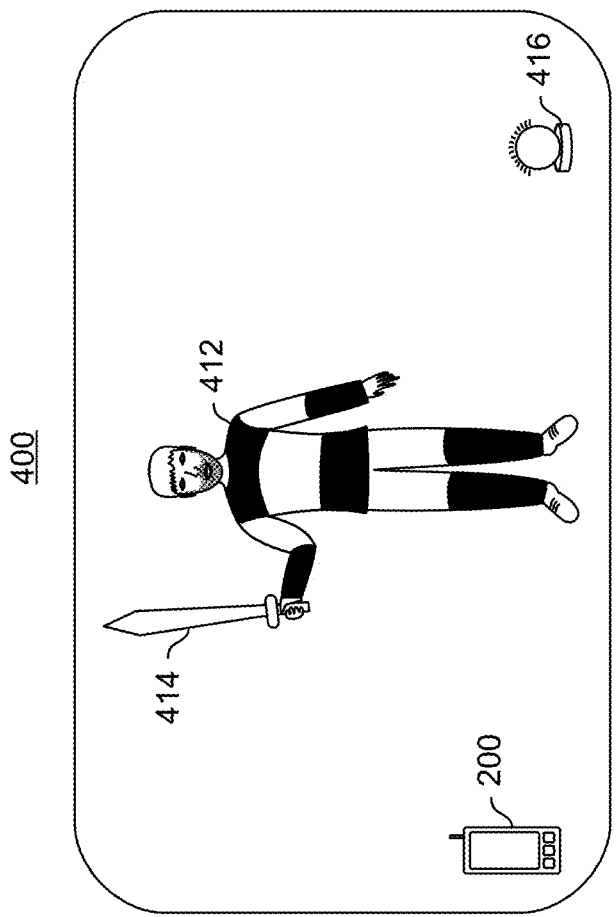

FIGS. 4A and 4B are illustrations of views provided in an AR/VR application to primary and secondary users, according to one embodiment described herein. In an embodiment, FIGS. 4A and 4B depict a shared virtual environment corresponding to a shared physical environment, in which both the primary and secondary users are located. For example, the primary and secondary users could be located in the same physical room. In an embodiment, an AR/VR application (e.g., the AR/VR applications 240 and 280 illustrated in FIG. 2) is a video game. Alternatively, the AR/VR application can be any other suitable AR/VR application.

FIG. 4A illustrates the view 400 of the AR/VR application 240 by a primary user (e.g., the primary user 102 illustrated in FIG. 1). In an embodiment, the view 400 can be provided to the primary user 102 using the head mounted display 300 and the primary user device 200. The view 400 includes a game character 412 holding a sword 414, facing the user 102. The view 400 further includes a beacon 416 (e.g., the beacon 130 illustrated in FIG. 1).

FIG. 4B illustrates the view 450 of an AR/VR application (e.g., the AR/VR application 280) by a secondary user (e.g., the secondary user 104 illustrated in FIG. 1). In an embodiment, the view 450 can be provided to the secondary user 104 using secondary user device 250. The view 450 includes the same virtual environment, with the game character 412 holding the sword 414, this time standing in profile to the user 104. The view 450 further includes the same physical environment, including the beacon 416 (e.g., the beacon 130 illustrated in FIG. 1). In an embodiment, the secondary view 450 provides to the secondary user 104 a view of the same virtual environment provided to the primary user 102. In an embodiment, the secondary view 450 depicts the AR/VR application 280 from a different perspective than the primary view 400. Alternatively, the secondary view 450 can match (or partially match) the perspective of the primary view 400.

Figure 5:
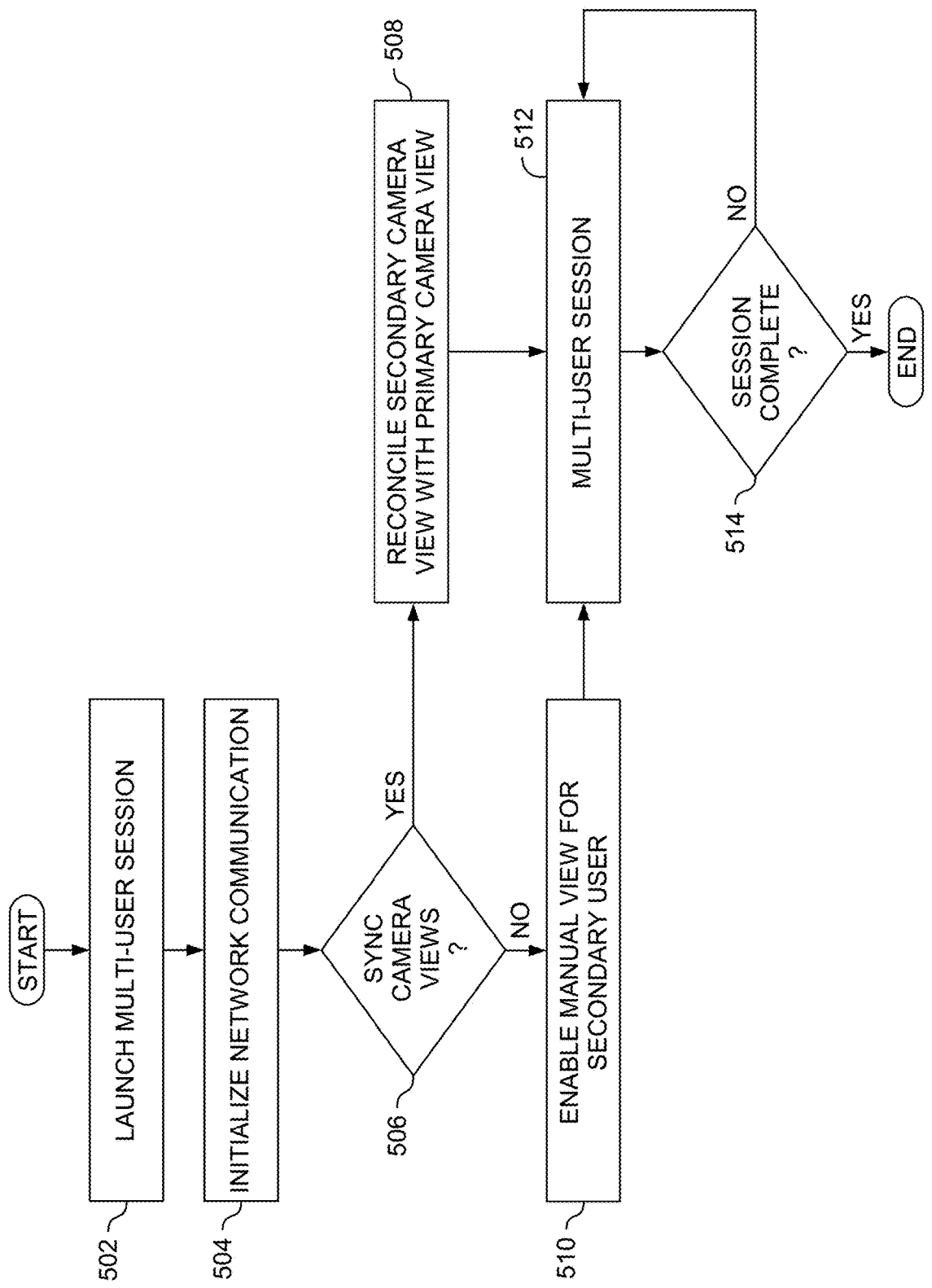
FIG. 5 is a flow chart illustrating second screen interaction in an AR/VR application, according to one embodiment described herein.

FIG. 5 is a flow chart illustrating second screen interaction in an AR/VR application, according to one embodiment described herein. At block 502, a user (e.g., the primary user 102 or the secondary user 104 illustrated in FIG. 1) launches a multi-user session. In an embodiment, the primary user 102 can launch a multi-user session using the primary user device 200. Alternatively, the secondary user 104 can launch a multi-user session using the secondary user device 250.

At block 504, the AR/VR application (e.g., the AR/VR application 240) initializes network communication between the primary user device (e.g., the primary user device 200) and the secondary user device(s) (e.g., the secondary user devices 250) using the network interfaces (e.g., the network interface 210 in the primary user device 200 and the network interface 260 in the secondary user device 250). As discussed above, in an embodiment a primary user device 200 interacts with a single secondary user device 250. Alternatively, a primary user device 200 interacts with multiple secondary user devices 250. In an embodiment, the interaction server module (e.g., the interaction server module 242 in the primary user device 200) initiates a network connection with the interaction client module (e.g., the interaction client module 284 in the secondary user device 250). In an embodiment, the interaction server module 242 can search for nearby secondary user devices 250 and automatically establish a network connection. Alternatively, a primary user 102 can input an identifier or address for the secondary user device 250.

In an embodiment, the network connection between the primary user device 200 and the secondary user device 250 can use any suitable communication network, including the Internet, a local access network, or a wide access network. The network connection can be a wired or wireless network. The communication network can use any suitable communication protocol, including any suitable wireless protocol. For example, the communication network can use an IEEE Wi-Fi standard, like an 802.11 standard, another Wi-Fi standard, a cellular protocol (including 3G, LTE, 4G and others), Bluetooth, and others. Further, the communication network can use several different communication protocols.

Alternatively, the secondary user device 250 can initialize the network connection with the primary user device 260. In an embodiment, the interaction client module 284 on the secondary user device 250 can search for nearby primary user devices 200 and automatically establish a network connection. Alternatively, a secondary user 104 can input an identifier or address for the primary user device 200.

At block 506, the AR/VR application (e.g., the AR/VR application 240) determines whether to synchronize camera views between the primary and secondary user(s). As discussed above, in an embodiment, the system includes a primary user 102 and one secondary user 104. Alternatively, the system can include multiple secondary users 104. In an embodiment, the primary user 102 instructs the AR/VR application 240 whether to synchronize views between the primary and secondary user devices (e.g., between the primary user device 200 and the secondary user device 250). Alternatively, the AR/VR application 240 can be configured to automatically synchronize camera views between the devices, or to automatically not synchronize views between the device.

If the AR/VR application (e.g., the AR/VR application 240) determines to synchronize camera views, at block 508, the AR/VR application (e.g., the AR/VR application 240) has determined to synchronize camera views, and so the AR/VR application 240 reconciles the secondary camera view with the primary camera view. In an embodiment, the AR/VR application 240 identifies the relative physical position of the secondary user device 250 compared with the primary user device 200, and configures the camera view for the secondary user device 250 to match the relative physical positions. This is discussed in more detail in relation to FIG. 6. In an embodiment, the AR/VR application 240 in the primary user device 200 reconciles the camera views. Alternatively, the AR/VR application 280 in the secondary user device 250 (alone, or in combination with the AR/VR application 240) reconciles the camera views.

If the AR/VR application (e.g., the AR/VR application 240 or 280) determines not to synchronize camera views, at block 510 the AR/VR application enables manual view for the secondary user. In an embodiment, the secondary user 104 can choose from several options for the manual view. In an embodiment, the secondary user 104 can use a first person view that mirrors the view of the primary user 102. In this example, the primary user device 200 can transmit visual data to the secondary user device 250 to provide a view mirroring the view shown on the primary user device 200.

In another embodiment, the secondary user 104 can use a first person view that mirrors one of the visual sensors used for the primary user device 200. In an embodiment, the primary user device 200 can be used with the head mounted display 300. The head mounted display 300 can include multiple visual sensors 302. For example, the head mounted display 300 can include two visual sensors 302, one for each eye of the primary user 102. In this embodiment, the primary user device 200 can transmit to the secondary user device 250 the view provided by one of these visual sensors 302—for example, this can provide the secondary user 104 with a view mirroring one of the eyes of the primary user 102.

In another embodiment, the AR/VR application (e.g., the AR/VR application 240 or 280) allows a secondary user 104 to control a virtual third person camera viewing the primary user 102. For example, in an embodiment the AR/VR application is a video game. The primary user device 200 provides the primary user 102 with a first person view of the game. For the secondary user 104, the AR/VR application configures a virtual camera view to be above and behind the primary player, by default. The secondary user device 250 provides the secondary user 104 with a third person view of the movements and actions of the primary player, along with the surrounding. In an embodiment, the secondary user 104 can manually control this camera view (e.g., moving the camera perspective around the primary user, zooming, etc.). Alternatively, this third person camera view can start in any suitable position, or the default position can be configured by a user.

At block 512 the AR/VR application (e.g., the AR/VR application 240) establishes a multi-user session. In an embodiment, the primary user device 200 acts as a network server for the session, using the interaction server module 242. In an embodiment, the secondary user device 250 acts as a network client for the session, using the interaction client module 284. In an embodiment, the AR/VR application 240 further uses a central server to control the session (e.g., the central server 950 illustrated in FIG. 9). Further, in an embodiment the secondary user device 250 can interact with the AR/VR application 240 through communication with the primary user device 200. For example, the AR/VR application can be a video game, and the secondary user device 250 can initiate a gameplay attack or other gameplay interaction (e.g., the secondary user 104 can tap or swipe a touch sensitive screen in the secondary user device 250 to initiate an attack). The interaction between the primary user device 200 and the secondary user device 250 is discussed further in relation to FIGS. 8 and 9.

At block 510, the AR/VR application (e.g., the AR/VR application 240 or 280) determines whether the multi-user session is complete. If the session is not complete, the flow returns to block 512 and the session continues. If the session is complete, the flow ends.

Figure 6:
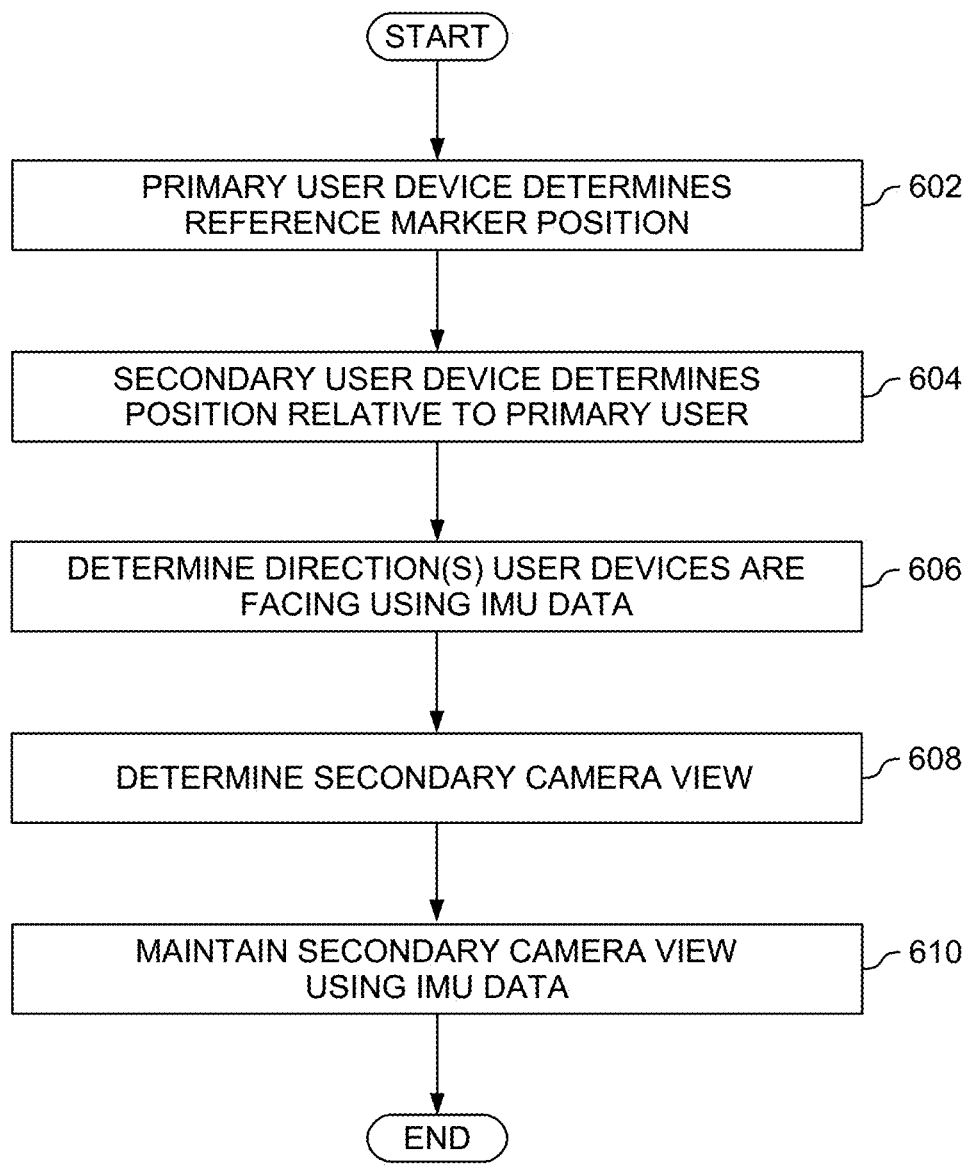
FIG. 6 is a flow chart illustrating reconciling primary and secondary camera views in an AR/VR application, according to one embodiment described herein.

FIG. 6 is a flow chart illustrating reconciling primary and secondary camera views in an AR/VR application, according to one embodiment described herein. In an embodiment, FIG. 6 corresponds with block 508 illustrated in FIG. 5. At block 602, the AR/VR application (e.g., the AR/VR application 240) determines the position of a reference marker in the physical world. In an embodiment, the reference marker can be a lighted beacon (e.g., the beacon 130 illustrated in FIG. 1). In this embodiment, the AR/VR application 240 can use two visual sensors (e.g., the visual sensors 302 in the head mounted display 300) to triangulate the physical position of the beacon 130 in the physical world. This allows the AR/VR application 240 to determine the position of the primary user 102 relative to the beacon 130.

Alternatively the AR/VR application 240 uses two markers (e.g., two beacons 130). In an embodiment, the two beacons 130 can light up in different colors. The AR/VR application 240 can then use the visual sensors (e.g., visual sensors 302 in the head mounted display 300) to determine the position of each beacon 130. Further, the AR/VR application 240 can use the two visual sensors 302 to determine the distance between the beacons 130. In an embodiment, the AR/VR application 240 can use an Augmented Reality API kit to assist in identifying the beacons 130 using the visual sensors 302.

At block 604, the AR/VR application 280 on the secondary user device 250 determines the position of the secondary user 104 relative to the primary user 102. In an embodiment, the AR/VR application 280 uses a visual sensor (e.g., the camera 252) to locate a marker (e.g., the beacon 130). The AR/VR application 280 can then use the position of this marker, relative to each of the primary user device 200 and the secondary user device 250, to determine the position of the secondary user device 250 relative to the primary user device 200.

In an embodiment, the secondary user device contains only one visual sensor 252, and so the secondary user device 250 cannot triangulate the distance to the beacon 130. In this embodiment, the view from the visual sensor 252 alone may not be sufficient to determine the distance of the secondary user device 250 from the beacon 130. In this embodiment, the secondary user device 250 can rely on data from the primary user device 200 to complete this determination. For example, the primary user device 200 can provide additional data to the secondary user device 250 to allow the secondary user device 250 to determine the distance from the secondary user device 250 to the beacon 130.

In another embodiment, instead of (or in addition to) relying on the beacon 130, the AR/VR application 280 running in the secondary user device 250 can rely on a glyph displayed by the primary user device 200. This is discussed in more detail in relation to FIG. 7. In this embodiment, the secondary user device 250 can identify this glyph and use its location to determine the location of the primary user device 200.

At block 606, the AR/VR application (e.g., the AR/VR application 240 and 280) determines the direction(s) the user devices are facing using IMU data. In an embodiment, at blocks 602 and 604 the AR/VR application determines the relative position of the secondary user device 250 and the primary user device 200. This may not, however, determine which direction each user device is facing. In an embodiment, the AR/VR applications 240 and 280 can use IMU data (e.g., data from one or more of the IMUs 212, 262, or 312) to determine the direction each user device is facing. For example, the AR/VR application 240 running in the primary user device 200 can use data from the IMU 212 to determine the direction in which the primary user device 200 is facing. This data can be supplemented, or replaced, with data from the IMU 312 in the head mounted display 300, if the head mounted display 300 includes an IMU. As another example, the AR/VR application 280 running in the secondary user device 250 can use data from the IMU 262 to determine the direction in which the secondary user device 250 is facing.

At block 608, the AR/VR application determines the view to be displayed by the secondary user device 250. In an embodiment, the AR/VR application uses the physical locations of the user devices 200 and 250 (determined at blocks 602 and 604, above) and the directions in which the user devices 200 and 250 are facing (determined at block 606, above), to generate a camera view for the secondary user device 250 that mimics the position of the secondary user 104 relative to the primary user 104 in the physical world. For example, the AR/VR application 104 can be a video game. The primary user device 200 can display a game character (e.g., a villain) to the primary user 102. In an embodiment, the game character can appear to be directly in front of the primary user 102. The secondary user 104 can be located off to the side of the primary user 102—for example, to the right of the primary user on a couch. At block 608, the AR/VR application generates a view of the game in which the secondary user device 250 displays a view of the game character from the right-side perspective, mimicking the view if the game character were physically present in the room.

In an embodiment, the AR/VR application 240 running on the primary user device 200 can determine the secondary camera view. For example, as discussed further with regard to FIGS. 8 and 9, the primary user device 200 can operate as a network server, transmitting frames of video data to the secondary user device 250 for display. Alternatively, the AR/VR application 280 running on the secondary user device 250 can determine the secondary camera view. As another alternative, the primary user device 200 and secondary user device 250 can determine the secondary camera view together.

At block 610, the AR/VR application (e.g., the AR/VR application 240, 280, or both) maintains the secondary camera view using IMU data. In an embodiment, the primary user 102 and the secondary user 104 may move throughout the physical world so that the reference marker (e.g., the beacon 130) is no longer in view. In this embodiment, IMU data can be used to track the movement of each user and predict and update the secondary camera view, without relying on the beacon 130. For example, the AR/VR application 240 can use data from the IMUs 212 and 312 to track the movement of the primary user 102. As another example, the AR/VR application 280 can use data from the IMU 262 to track the movement of the secondary user 104. The AR/VR application can then predict and update the secondary view to match the changing physical positions of the users.

Figure 7:
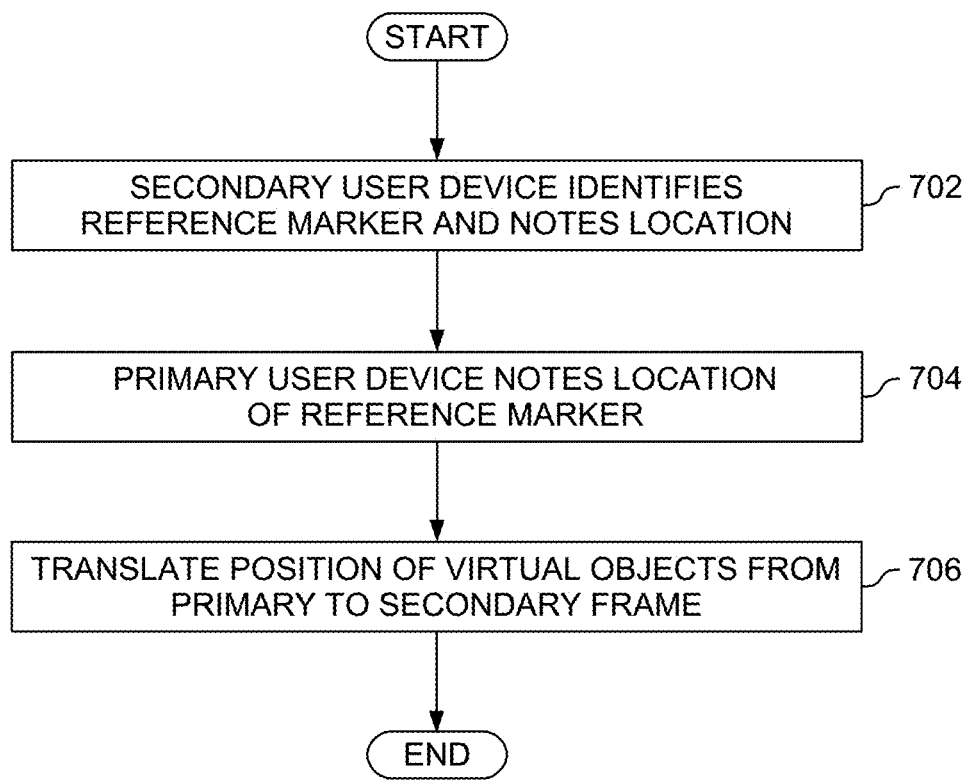
FIG. 7 is a flow chart illustrating a secondary player determining his or her position relative to the player, in an AR/VR application, according to one embodiment described herein.

FIG. 7 is a flow chart illustrating a secondary player determining his or her position relative to the player, in an AR/VR application, according to one embodiment described herein. As discussed above in relation to block 604 illustrated in FIG. 6, in an embodiment the AR/VR application determines the physical position of the secondary user device 250 relative to the primary user device 200 by identifying a beacon 130 as a reference marker using a visual sensor (e.g., a camera 252). In another embodiment, a secondary user device 250 cannot (or does not) identify the beacon 130 using the camera 252. For example, the secondary user device 250 may not be capable of registering the blob detection markers available to the primary user device 200 in combination with the head mounted display 300.

In this alternative embodiment, at block 702 the AR/VR application (e.g., the AR/VR application 280) identifies an alternative reference marker and notes the location of the reference marker. In one embodiment, the AR/VR application 280 identifies a glyph, or symbol, displayed by the primary user device 200 and the head mounted display 300. For example, as discussed above, in an embodiment the head mounted display 300 includes a transparent display, through which the display 204 of the primary user device 200 is reflected and focused using the optics 308. In this embodiment, items displayed to the primary user 102 using the head mounted display 300 are also visible to the secondary user 104, through the transparent portion of the head mounted display 300.

The AR/VR application 240 can generate a particular glyph (or symbol) at the start of a multi-user session and display the glyph to the primary user 102. The glyph will also be visible to the secondary user device 250 through the transparent display of the head mounted display 300. The AR/VR application 280 can use a visual sensor in the secondary user device 250 (e.g., the camera 252) to capture and identify the glyph. The AR/VR application 280 notes the location of the glyph and uses the position as the reference point for the secondary user device 250's coordinate frame.

In an alternative embodiment, the AR/VR application 280 identifies another object in the physical environment as the reference marker for the secondary user device 250, instead of a glyph. For example, the AR/VR application 280 can use the camera 252 to identify the head mounted display 300 worn by the primary user 102. As another example, the AR/VR application 280 can use the camera 252 to identify a peripheral device 400 held by the primary user 102.

At block 704, the AR/VR application (e.g., the AR/VR application 240 and 280) notes the location of the reference marker (e.g., the glyph) relative to another fixed reference point in the primary user device 200's coordinate frame (e.g., the beacon 130). For example, the AR/VR application 240 notes the location of the glyph relative to the fixed beacon 130. The AR/VR application 240 places virtual objects in the coordinate frame relative to the beacon 130.

At block 706, the AR/VR application 240 translates the position of the virtual objects from the primary coordinate frame (for the primary user device 200) to the secondary coordinate frame (for the secondary user device 250). In an embodiment, the AR/VR application 240 uses the stored position of the beacon 130, and the position of the glyph, to translate the position of virtual objects between the coordinate frames. In this embodiment, the location of the beacon 130 allows translation between coordinate frames—the glyph (or other reference marker from block 702) serves as a known intermediate point to allow for translation when the secondary user device 250 does not recognize the beacon 130.

Figure 8:
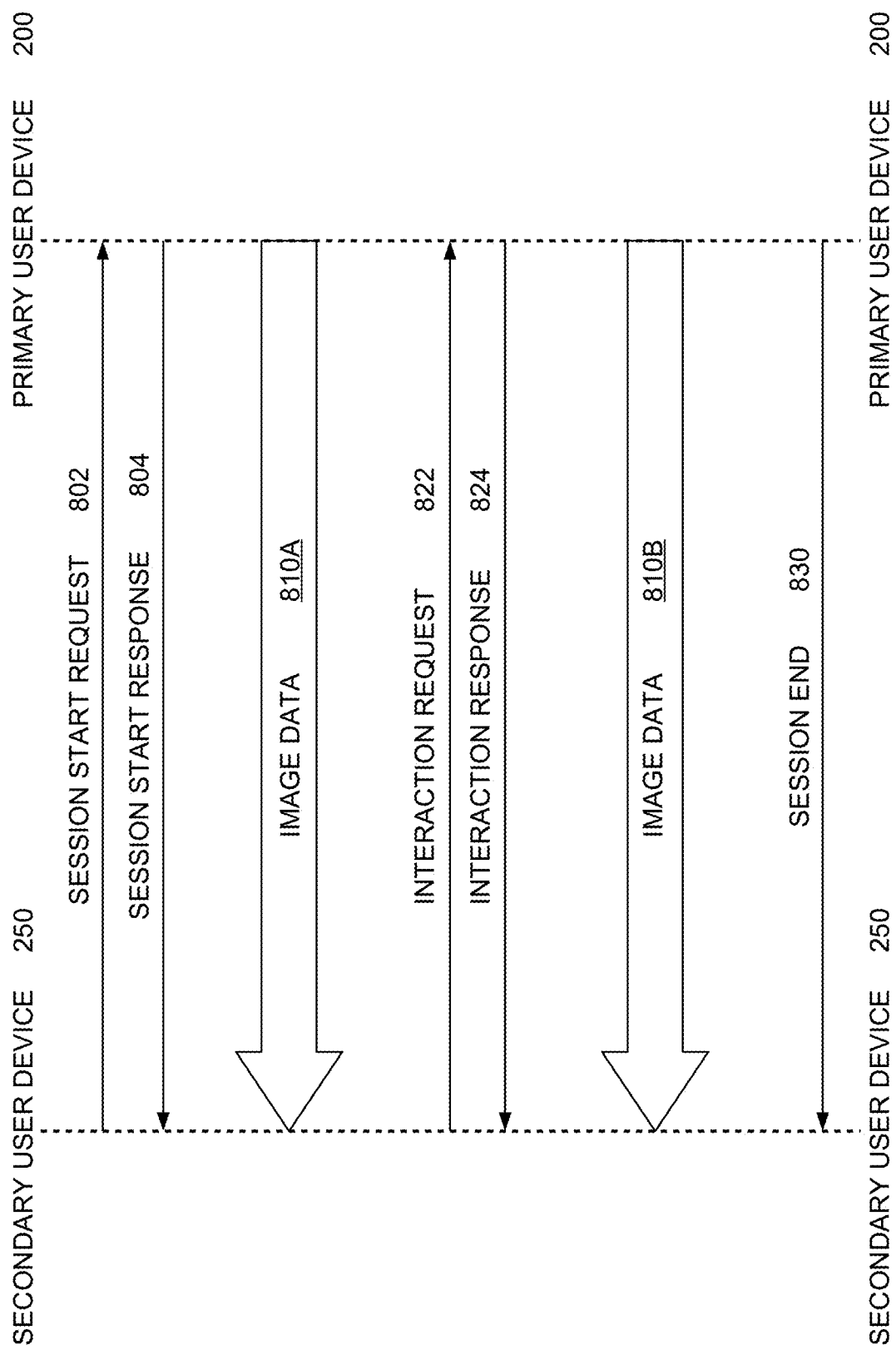
FIG. 8 is an illustration of network messages supporting second screen interaction in an AR/VR application, according to one embodiment described herein.

FIG. 8 is an illustration of network messages supporting second screen interaction in an AR/VR application, according to one embodiment described herein. As discussed above, in an embodiment the AR/VR application allows a secondary user device 250 to not only view the application, but also interact with the application. In an embodiment, a primary user device 200 operates as a network server while one or more secondary user devices 250 operate as network clients. An interaction client module (e.g., the interaction client module 284 in the secondary user device 250) transmits a session start request 802 to an interaction server module (e.g., the interaction server module 242 in the primary user device 200).

In an embodiment, the session start request 802 includes information relating to the secondary user device 250. In an embodiment, this information can be used to improve the user experience for the AR/VR applications 240 and 280. For example, the session start request 802 can include information about the processing capabilities of the secondary user device 250, the I/O capabilities of the secondary user device 250, the camera capabilities of the secondary user device 250, or other relevant information. The primary user device 200 can optimize the AR/VR applications 240 and 280 based on this information. For example, the primary user device 200 could provide higher quality images to a secondary device 250 with greater processing power, and could provide lower quality images to a secondary user device 250 with lesser processing power. Alternatively, the primary user device 200 can receive this information about the secondary user device 250 through another network message (instead of, or in addition to, the session start request 802), through input from a user 102, or in another suitable manner. The interaction server module 242 responds to the session start request 802 with a session start response 804.

This initiates the multi-user session. In an embodiment, the interaction server module 242 transmits image data 810A to the interaction client module 284. In an embodiment, the AR/VR application 240 in the primary user device 200 determines the images that should be displayed by the secondary user device 250, and transmits the images to the secondary user device 250. For example, in an embodiment, the image data 810A is made up of compressed images for display by the secondary user device. Alternatively, the AR/VR application 280 in the secondary user device 250 can generate images for display in the secondary user device. In this embodiment, the image data 810A can include reference values to allow the secondary user device 250 to generate the correct images (e.g., data describing what should be displayed, which the AR/VR application 280 in the secondary user device 250 uses to generate the images for display). For example, in an embodiment, the image data 810 includes game state data describing the identity, current state, and coordinate positions of virtual items for display by the secondary user device 250. In this embodiment, the AR/VR application 280 in the secondary user device 250 generates the images for display based on the received game state data.

When a secondary user 104 wishes to interact with the application, the interaction client module 284 sends an interaction request 822 from the secondary user device 250 to the primary user device 200. The interaction request 822 includes data describing the interaction. For example, the interaction request 822 can describe an action that should be taken in a video game (e.g., an attack, or use of an item held by the virtual player). Alternatively, the interaction request 822 can include a text or audio message to be presented to the primary user 102. The interaction server module 242 transmits an interaction response 824 from the primary user device 200 to the secondary user device 250. For example, the interaction response 824 can be an acknowledgment that the interaction was received.

In an embodiment, a secondary user device 250 can interact with the AR/VR application 240 throughout operation of the application. For example, the interaction server module 242 can continue to transmit image data 810B from the primary user device 200 to the secondary user device 250 after an interaction. When the application concludes, the interaction server module 242 transmits a session end 830 message from the primary user device 200 to the secondary user device 250.

Figure 9:
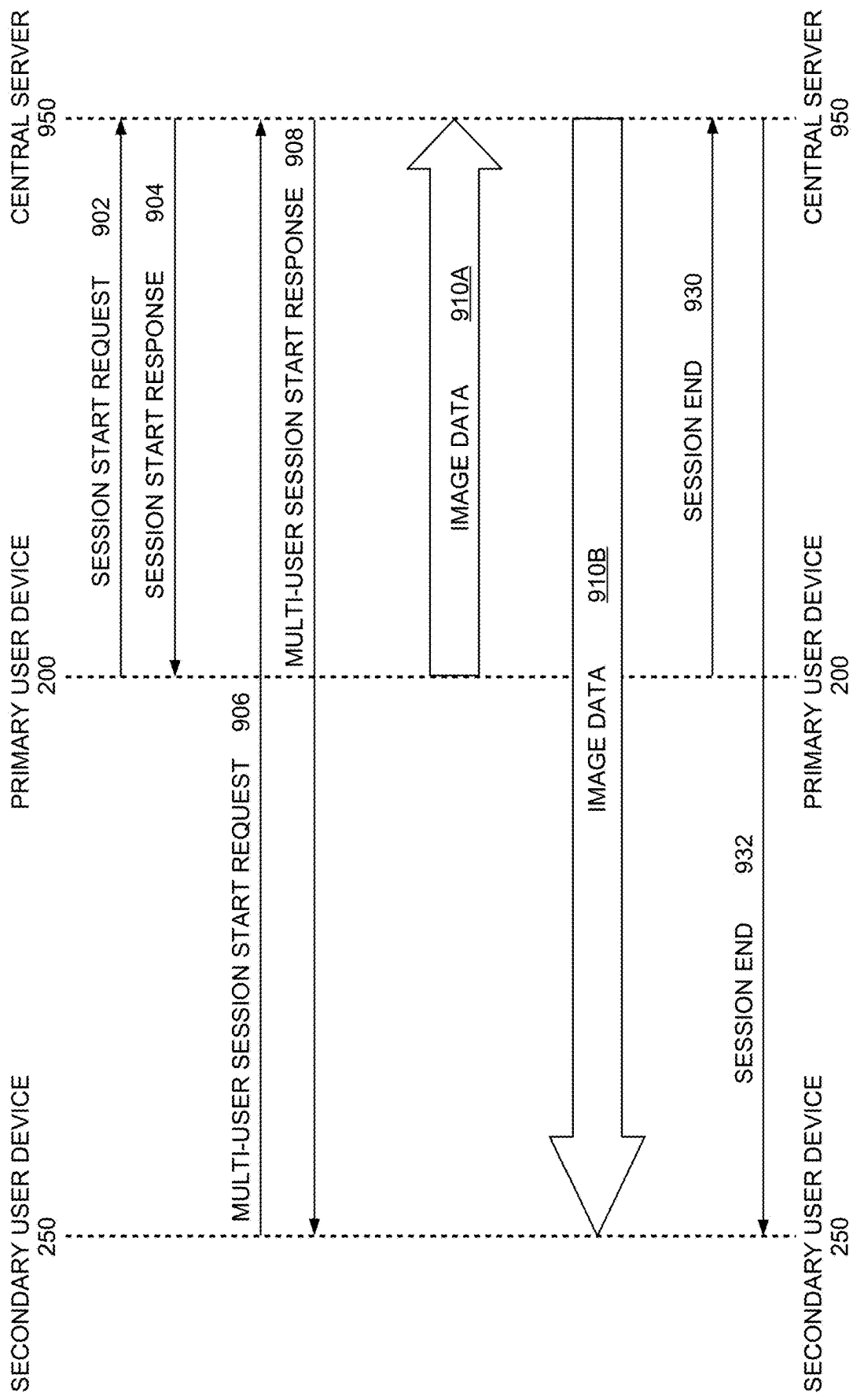
FIG. 9 is a further illustration of network messages supporting second screen interaction in an AR/VR application, according to one embodiment described herein.

FIG. 9 is a further illustration of network messages supporting second screen interaction in a AR/VR application, according to one embodiment described herein. As discussed above in relation to FIG. 8, a primary user device 200 can operate as a network server while one or more secondary user devices 250 operate as network clients. As illustrated in FIG. 9, the AR/VR application can also use a central server 950 to facilitate multi-person use of the application.

The AR/VR application 240 on the primary user device 200 transmits a session start request 902 to initiate the application session. An application on the central server 950 (e.g., an adapted interaction server module 242) responds with a session start response 904 to the primary user device. An interaction client module (e.g., the interaction client module 284 on the secondary user device) transmits a multi-user session start request 906. In an embodiment, the interaction client module 284 transmits the multi-user session start request 906 to the central server 950. An interaction server module (e.g., an interaction server module 242 on the central server 950) responds by transmitting a multi-user session start response 908 from the central server 950 to the secondary user device 250. Alternatively, the primary user device 200 can act as an intermediary between the secondary user device 250 and the central server.

The AR/VR application (e.g., the AR/VR application 240) transmits image date 910A to the central server 950. As discussed above in relation to FIG. 8, this image data 910A can include compressed images, game state data to allow an interaction client module 284 to generate suitable graphic images, or other suitable data. The central server 950 then acts as a relay for the image data, transmitting image data 910B to the secondary user device 250. In an embodiment, the image data 910B matches the image data 910A transmitted from the primary user device 200 to the central server 950. At the end of the application session, the AR/VR application 240 transmits a session end 930 message from the primary user device 200 to the central server 950, and the central server 950 responds with a session end 932 message to the secondary user device 250.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method of providing multi-screen interaction in an interactive application, comprising:

establishing an application session using a primary user device, the application session comprising a virtual environment relating to a physical environment in which the primary user device is located, wherein the primary user device is configured to display one or more graphical images relating to a primary virtual camera view of the virtual environment;

determining a physical location of a secondary user device relative to the primary user device based on identifying a virtual glyph using the secondary user device, wherein the virtual glyph comprises a computer generated symbol generated using the primary user device, wherein the virtual glyph is generated to be visible at both the primary user device and the secondary user device, and wherein the virtual glyph is configured to be visible to the secondary user device through a transparent display of the primary user device;

determining a secondary virtual camera view of the virtual environment, wherein the secondary virtual camera view relates to the primary virtual camera view and is based on the determined physical location of the secondary user device relative to the primary user device;

transmitting image data relating to the secondary virtual camera view from the primary user device to the secondary user device, wherein the secondary user device is configured to display a first graphical image relating to the secondary virtual camera view based on the image data; and responsive to receiving an interaction request from the secondary user device, controlling, by the primary user device, the application session based on the interaction request, wherein the secondary user device is further configured to:

generate a second graphical image relating to the secondary virtual camera view, based on data received from an Inertial Measurement Unit (IMU) at the secondary user device, and display the second graphical image.

2. The method of claim 1, wherein the application session relates to one of an Augmented Reality (AR) application and a Virtual Reality (VR) application, wherein the primary user device comprises a head mounted display, and wherein the secondary user device does not comprise a head mounted display.

3. The method of claim 1, wherein determining the physical location of the secondary user device relative to the primary user device further comprises:

capturing a first image of a physical reference object using a first visual sensor relating to the primary user device;

identifying, using one or more computer processors, a first position of the physical reference object in the first image;

identifying, using one or more computer processors, a second position of the physical reference object based on a second image captured by the secondary user device during the application session; and determining the physical location of the secondary user device relative to the primary user device based on the first and second positions of the physical reference object.

4. The method of claim 1, wherein determining the physical location of the secondary user device relative to the primary user device further comprises:

capturing a first image of a first physical reference object using a first visual sensor relating to the primary user device;

identifying, using one or more computer processors, a first position of the first physical reference object in the first image;

identifying, using one or more computer processors, a second position of a second physical reference based on a second image captured by the secondary user device during the application session; and determining the physical location of the secondary user device relative to the primary user device based on the first position of the first physical reference object and the second position of the second physical reference object.

5. The method of claim 1, further comprising:

establishing a network communication session between the primary user device and the secondary user device, wherein the primary user device acts as a network server controlling the application session and the secondary user device acts as a network client, wherein the primary user device transmits the image data to the secondary user device using the network communication session, wherein the secondary user device transmits the interaction request to the primary user device using the network communication session, and wherein the interaction request comprises a network message indicating information related to the interaction request.

6. The method of claim 1, further comprising:

generating, using the primary user device, the first graphical image relating to the secondary virtual camera view, wherein the image data transmitted from the primary user device to the secondary user device comprises the generated first graphical image.

7. The method of claim 1, wherein the secondary user device is configured to generate the second graphical image based on predicting, at the secondary user device, a physical location of the secondary user device based on the data received from the IMU at the secondary user device.

8. The method of claim 1, wherein the image data comprises game state data, and wherein the secondary user device is further configured to determine a viewing perspective for the secondary virtual camera view based on the game state data and to generate the first graphical image based on the viewing perspective.

9. The method of claim 1, further comprising:

enabling a manually configurable camera view by the secondary user device, wherein a viewing perspective of the manually configurable camera view is controlled by user interaction with the secondary user device.

10. The method of claim 1, wherein the primary user device comprises a mobile computing device and a head mounted display, wherein the virtual glyph is displayed by the mobile computing device, and wherein the identifying the virtual glyph using the secondary user device comprises capturing an image of the virtual glyph displayed by the mobile computing device, using an image capture device in the secondary user device.

11. A computer program product for providing multi-screen interaction in an interactive application, the computer program product comprising:

a non-transitory computer-readable storage medium having computer-readable program code embodied therewith, the computer-readable program code executable by one or more computer processors to perform an operation, the operation comprising:

establishing an application session using a primary user device, the application session comprising a virtual environment relating to a physical environment in which the primary user device is located, wherein the primary user device is configured to display one or more graphical images relating to a primary virtual camera view of the virtual environment;

determining a physical location of a secondary user device relative to the primary user device based on identifying a virtual glyph using the secondary user device, wherein the virtual glyph comprises a computer generated symbol generated using the primary user device, wherein the virtual glyph is generated to be visible at both the primary user device and the secondary user device, and wherein the virtual glyph is configured to be visible to the secondary user device through a transparent display of the primary user device;

determining a secondary virtual camera view of the virtual environment, wherein the secondary virtual camera view relates to the primary virtual camera view and is based on the determined physical location of the secondary user device relative to the primary user device;

transmitting image data relating to the secondary virtual camera view from the primary user device to the secondary user device, wherein the secondary user device is configured to display a first graphical image relating to the secondary virtual camera view based on the image data; and responsive to receiving an interaction request from the secondary user device, controlling, by the primary user device, the application session based on the interaction request, wherein the secondary user device is further configured to:
  generate a second graphical image relating to the secondary virtual camera view, based on data received from an Inertial Measurement Unit (IMU) at the secondary user device, and
  display the second graphical image.

12. The computer program product of claim 11, wherein the application session relates to one of an Augmented Reality (AR) application and a Virtual Reality (VR) application, wherein the primary user device comprises a head mounted display, and wherein the secondary user device does not comprise a head mounted display.

13. The computer program product of claim 11, wherein determining the physical location of the secondary user device relative to the primary user device further comprises:
  capturing a first image of a physical reference object using a first visual sensor relating to the primary user device;
  identifying a position of the physical reference object in the first image;
  identifying a position of the virtual glyph based on a second image captured by the secondary user device during the application session; and
  determining the physical location of the secondary user device relative to the primary user device based on the position of the physical reference object and the position of the virtual glyph.

14. The computer program product of claim 11, the operation further comprising:
  establishing a network communication session between the primary user device and the secondary user device, wherein the primary user device acts as a network server controlling the application session and the secondary user device acts as a network client,
  wherein the primary user device transmits the image data to the secondary user device using the network communication session, wherein the secondary user device transmits the interaction request to the primary user device using the network communication session, and wherein the interaction request comprises a network message indicating information related to the interaction request.

15. The computer program product of claim 11, wherein the primary user device comprises a mobile computing device and a head mounted display, wherein the virtual glyph is displayed by the mobile computing device, and wherein the identifying the virtual glyph using the secondary user device comprises capturing an image of the virtual glyph displayed by the mobile computing device, using an image capture device in the secondary user device.

16. A system, comprising:
a processor; and
a memory storing a program, which, when executed on the processor, performs an operation, the operation comprising:
  establishing an application session using a primary user device, the application session comprising a virtual environment relating to a physical environment in which the primary user device is located, wherein the primary user device is configured to display one or more graphical images relating to a primary virtual camera view of the virtual environment;

determining a physical location of a secondary user device relative to the primary user device based on identifying a virtual glyph using the secondary user device, wherein the virtual glyph comprises a computer generated symbol generated using the primary user device, wherein the virtual glyph is generated to be visible at both the primary user device and the secondary user device, and wherein the virtual glyph is configured to be visible to the secondary user device through a transparent display of the primary user device;

determining a secondary virtual camera view of the virtual environment, wherein the secondary virtual camera view relates to the primary virtual camera view and is based on the determined physical location of the secondary user device relative to the primary user device;

transmitting image data relating to the secondary virtual camera view from the primary user device to the secondary user device, wherein the secondary user device is configured to display a first graphical image relating to the secondary virtual camera view based on the image data; and responsive to receiving an interaction request from the secondary user device, controlling, by the primary user device, the application session based on the interaction request, wherein the secondary user device is further configured to:
    generate a second graphical image relating to the secondary virtual camera view, based on data received from an Inertial Measurement Unit (IMU) at the secondary user device, and
    display the second graphical image.

17. The system of claim 16, wherein determining the physical location of the secondary user device relative to the primary user device further comprises:
  capturing a first image of a physical reference object using a first visual sensor relating to the primary user device;
  identifying a position of the physical reference object in the first image;
  identifying a position of the virtual glyph based on a second image captured by the secondary user device during the application session; and
  determining the physical location of the secondary user device relative to the primary user device based on the position of the physical reference object and the position of the virtual glyph.

18. The system of claim 16, the operation further comprising:
  establishing a network communication session between the primary user device and the secondary user device, wherein the primary user device acts as a network server controlling the application session and the secondary user device acts as a network client,
  wherein the primary user device transmits the image data to the secondary user device using the network communication session, wherein the secondary user device transmits the interaction request to the primary user device using the network communication session, and wherein the interaction request comprises a network message indicating information related to the interaction request.

19. The system of claim 16, wherein the primary user device comprises a mobile computing device and a head mounted display, wherein the virtual glyph is displayed by the mobile computing device, and wherein the identifying the virtual glyph using the secondary user device comprises capturing an image of the virtual glyph displayed by the mobile computing device, using an image capture device in the secondary user device.

\* \* \* \* \*